(12) United States Patent
Bisio et al.

(10) Patent No.: US 9,091,370 B2
(45) Date of Patent: Jul. 28, 2015

(54) BALL VALVE WITH CONTROL HANDLE AND RING-NUT SPANNER TOOL

(71) Applicant: F.I.P. FORMATURA INIEZIONE POLIMERI S.p.A., Casella, Genoa (IT)

(72) Inventors: Andrea Bisio, Casella (IT); Corrado Mazzacano, Casella (IT)

(73) Assignee: F.I.P. Formatura Iniezione Polimeri S.p.A., Casella (IT)

( * ) Notice: Subject to any disclaimer, the term of this patent is extended or adjusted under 35 U.S.C. 154(b) by 83 days.

(21) Appl. No.: 13/952,371

(22) Filed: Jul. 26, 2013

(65) Prior Publication Data
US 2014/0026981 A1    Jan. 30, 2014

(30) Foreign Application Priority Data
Jul. 26, 2012   (EP) .................................... 12425129

(51) Int. Cl.
*F16K 31/60* (2006.01)
*F16K 35/06* (2006.01)
*F16K 5/06* (2006.01)
*F16K 27/06* (2006.01)

(52) U.S. Cl.
CPC .............. *F16K 31/60* (2013.01); *F16K 5/0642* (2013.01); *F16K 5/0647* (2013.01); *F16K 27/067* (2013.01); *F16K 35/06* (2013.01)

(58) Field of Classification Search
CPC ....... F16K 31/60; F16K 35/06; F16K 27/067; F16K 5/0647; F16K 5/00
USPC ........ 137/315.18, 315.41; 251/315.01, 315.1, 251/315.11, 315.12, 292
See application file for complete search history.

(56) References Cited

U.S. PATENT DOCUMENTS

| 5,647,389 | A |  | 7/1997 | Holloway |
| 7,011,291 | B2 | * | 3/2006 | Miklo et al. ................... 251/109 |
| 7,306,010 | B2 | * | 12/2007 | Gruener, Sr. ............. 137/315.18 |
| 8,245,723 | B2 | * | 8/2012 | Mazzacano et al. ..... 137/315.41 |
| 8,726,927 | B2 | * | 5/2014 | Bisio et al. ............... 137/315.41 |
| 2009/0261280 | A1 |  | 10/2009 | Matsushita et al. |

FOREIGN PATENT DOCUMENTS

| EP | 2 149 731 A1 | 2/2010 |
| EP | 2 453 153 A1 | 5/2012 |
| FR | 2 756 034 A1 | 5/1998 |

* cited by examiner

*Primary Examiner* — Kevin Lee
(74) *Attorney, Agent, or Firm* — Dickstein Shapiro LLP

(57) ABSTRACT

A ball valve including a valve body with connection portions, one or more threaded ring-nuts screwable to the connection portions to connect them, a control handle and a ring-nut spanner tool suitable for engaging the ring-nut to screw and unscrew the ring-nuts from the connection portions. The ring-nut spanner tool is housed in a rest position in the control handle and can be moved from the rest position to a working position outside the control handle. In the working position, the ring-nut spanner tool can engage the ring-nut.

15 Claims, 10 Drawing Sheets

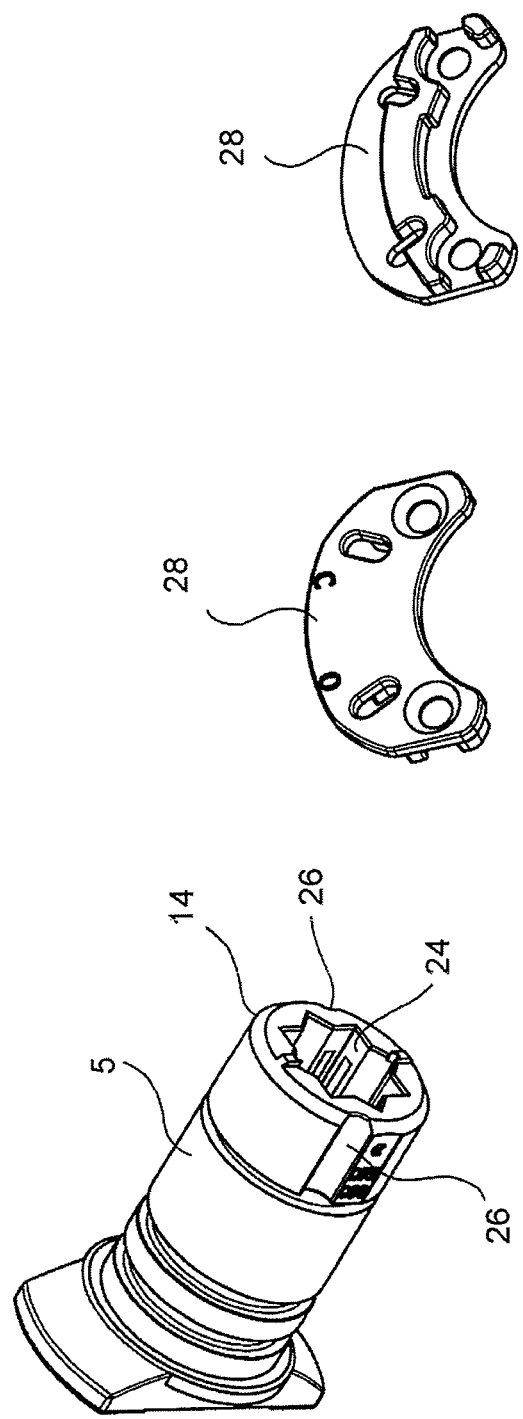

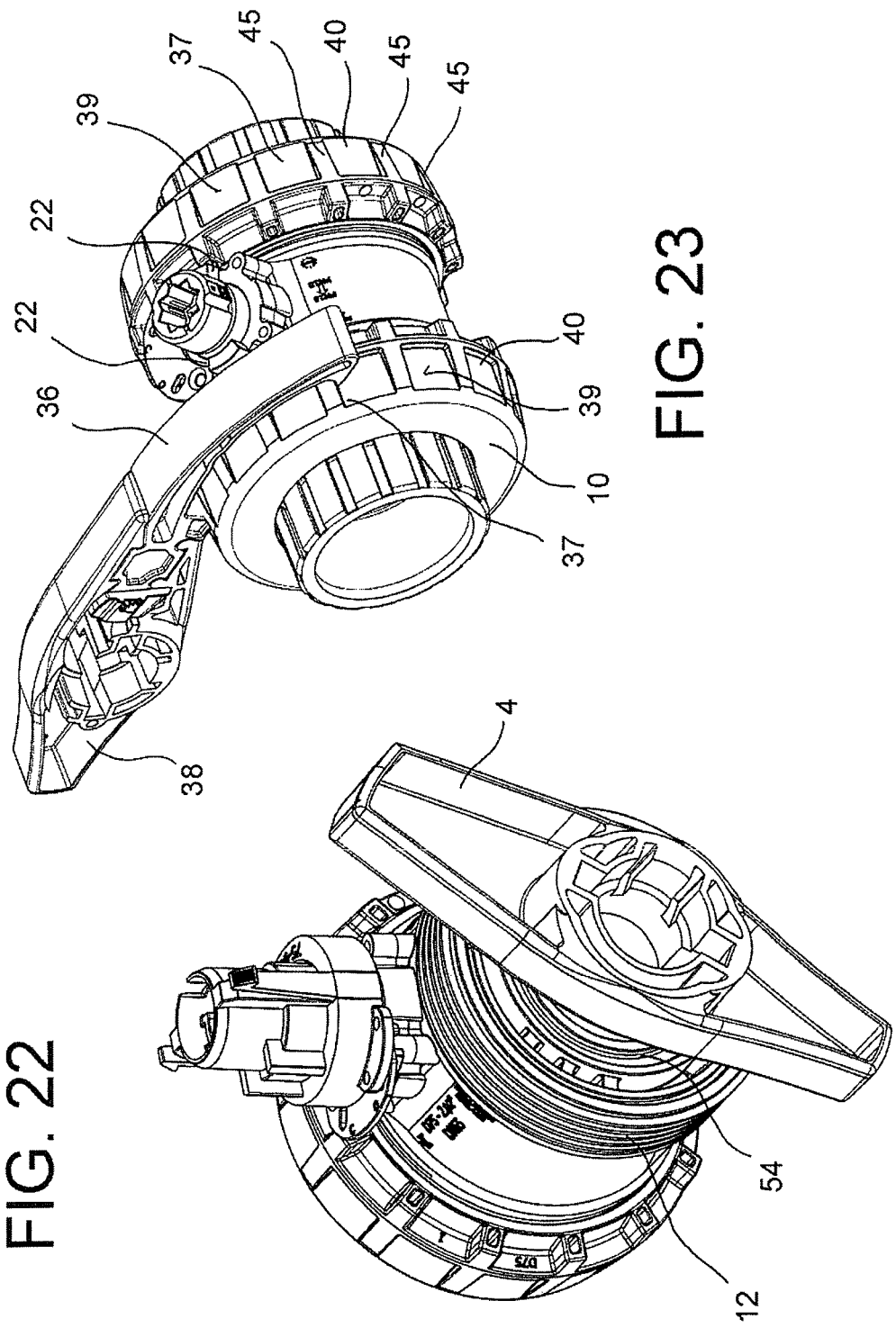

BALL VALVE WITH CONTROL HANDLE AND RING-NUT SPANNER TOOL

BACKGROUND OF THE INVENTION

1. Field of the Invention

The present invention relates in general to a device for conveying and/or distributing fluids with a control handle and, in particular, to a hydraulic valve with ring nut coupling, for example in fluid conveyance and distribution systems.

2. Description of the Related Art

In order to optimise and economise the production of fluid conveyance and distribution systems, such as hydraulic circuits, fitted with pipes and valves of various types, such as distributor valves, flow control valves, drain valves, damping valves, delivery valves or selector valves, the valves are produced normally independently of the pipes and connected to them only at the moment of assembly of the hydraulic circuit.

During the assembly for example of a hydraulic circuit, the valves and pipes are connected to each other in such a way as to permit performance of the desired functions.

To such purpose, the valve usually comprises an externally threaded connection portion and a ring nut with an inner threading, suitable for being screwed onto the connection portion to keep one end of a tube engaged with this connection portion.

This type of connection has the disadvantage that both the tightening of the ring nut during assembly and loosening of the ring nut for maintenance or replacement of the valve require free access to the ring nut so as to be able to grip it with a hand or tightening tool. However, this need for space to assemble and dismantle the valves and flow control devices is generally hard to reconcile with the very limited spaces available in the industrial, civil or military plants which the conveyance and distribution systems are part of. In fact, in most plants, the only freely accessible part of the valve is a control portion of the same such as a handle for regulating the flow through the valve. And it is precisely the control handle which often obstructs access to the connection ring nuts. From EP 1460321A a ball valve with connection ring nut and control handle is known, wherein the control handle can be unmounted from the valve and used as a tool to loosen or tighten the tightening rings to fix the position of a ball shutter inside the valve. The unmounting of the control handle, while in theory permitting improved access to the threaded connection portions and the to the ring nuts, proves time-consuming however and complex as regards the unmounting operations. As a result, the handle of the valve is used practically only to tighten the tightening rings during assembly of the valve, while the dismantling and subsequent reassembly of the handle to the valve body is avoided due to the difficulty of such operations.

SUMMARY OF THE INVENTION

The purpose of the present invention is therefore to propose a fluid conveying and/or distributing device, such as a valve, fitted with a housing with at least one ring nut connection portion and a control handle, having characteristics such as to permit a rapid and easy detachment and attachment of the control handle to the housing, in particular to a valve body.

A further purpose of the invention is to propose a fluid conveying and/or distributing device, such as a valve, having a housing with at least one ring nut connection portion and a control handle, having characteristics such as to permit an easier loosening and tightening of the ring nut coupling and/or of further device components.

A further purpose of the invention is to propose a fluid conveying and/or distributing device, such as a valve, fitted with a housing with at least one ring nut connection portion and a control handle, having characteristics such as to be installable, removable and replaceable in conditions of restricted space.

At least some of the objectives are achieved by a fluid conveying and/or distributing device, in particular a valve, comprising:

- a housing with one or more tubular connection portions detachably connectable to corresponding connection ends of a fluid conveying and/or distributing system,
- one or more threaded ring-nuts screwable respectively to one of the connection portions and connection ends to connect said connection portions to said connection ends,
- a control handle of said device,
- a ring-nut spanner tool suitable for engaging an attachment portion of the ring-nut to screw and unscrew the ring-nuts from the connection portions, wherein the ring-nut spanner tool is housed in a rest position in a tool cavity made in the control handle and can be moved from the rest position to a working position outside the tool cavity, and wherein in the working position the ring-nut spanner tool can engage the attachment portion of the ring-nut.

This makes it possible to more conveniently use the control handle as a tool for manipulating the device and to "expand" the control handle to greater dimensions in the working position and to retract or "collapse" the control handle to reduced dimensions in the rest position.

In accordance with an aspect of the invention, the fluid conveying and/or distributing device, in particular a valve, comprises further snap connection means for a removable connection of the control handle to the housing.

Thanks to the detachable and snap connection of the control handle, it can be rapidly and easily removed and attached to the housing, such as a valve body of a ball valve, to temporarily increase the access area to the connection portions and/or for a temporary use of the control handle as a tool for manipulating the device.

BRIEF DESCRIPTION OF THE DRAWINGS

For a clearer understanding of the invention and its advantages, several non-limiting examples of embodiments will be described below with reference to the attached drawings, wherein:

FIG. 18 shows a drive shaft for controlling a ball shutter of the ball valve, according to one embodiment;

FIGS. 19 and 20 are perspective views of a lock plate for the blocking by means of a lock of the control position of the handle according to one embodiment;

FIGS. 21 and 22 show the use of the control handle detached from the valve body as a tool for tightening and unscrewing the tightening rings of the valve;

FIG. 23 shows the use of the control handle detached from the valve body as a tool for screwing and unscrewing the ring nuts to the connection portions. Moreover, in FIG. 23 a connection hub has been removed to illustrate the connection area with the end of the drive shaft of the valve;

DETAILED DESCRIPTION OF THE PREFERRED EMBODIMENTS

Figure 1:
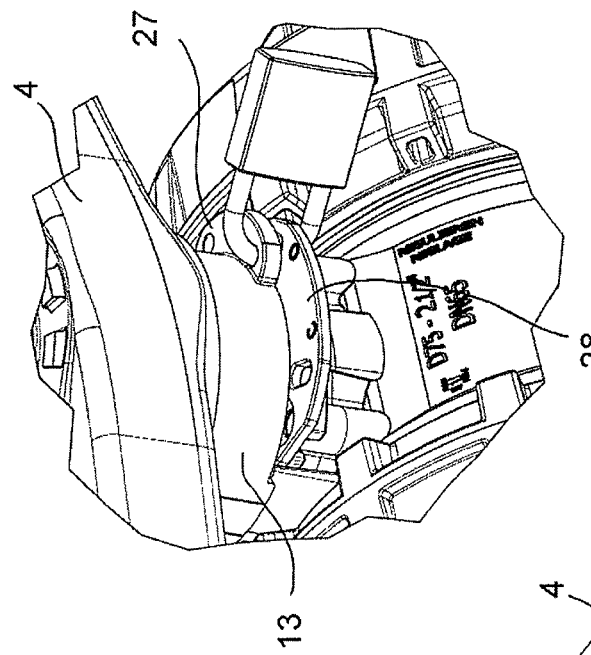
FIG. 1 is a perspective view of a ball valve with a control handle attached according to one embodiment of the invention.
Figure 2:
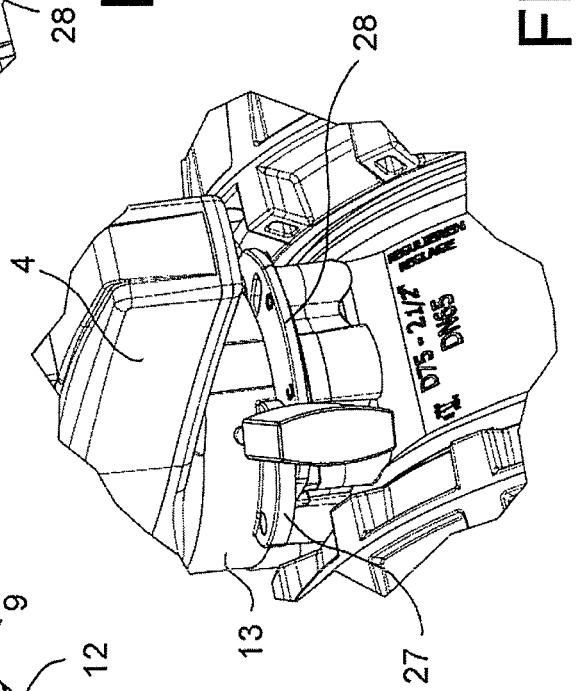
FIGS. 2 and 3 are enlarged views of a detail of the valve in FIG. 1 with the control handle in an open position and in a closed position.
Figure 3:
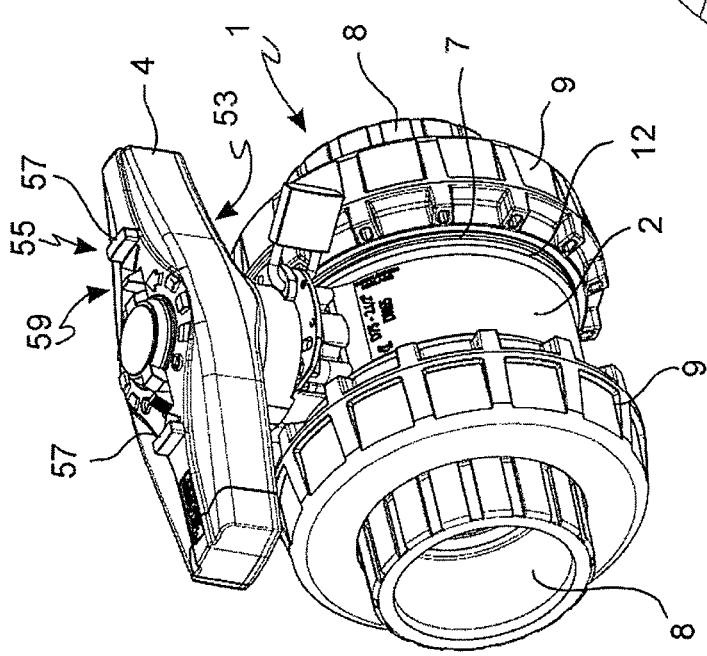
Figure 5:
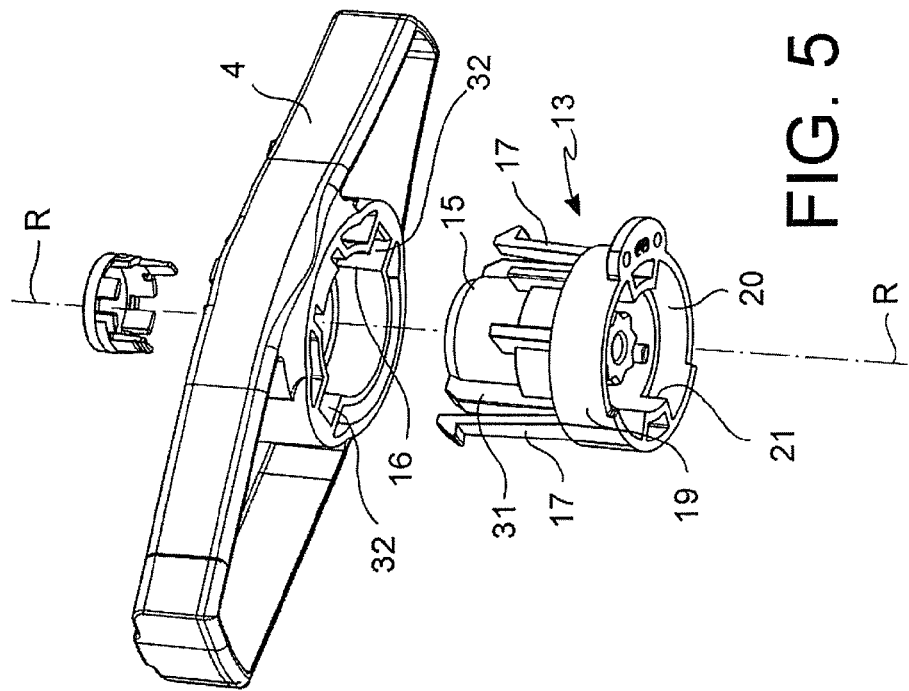
FIG. 5 is an exploded view of a detail of the valve, according to one embodiment.
Figure 4:
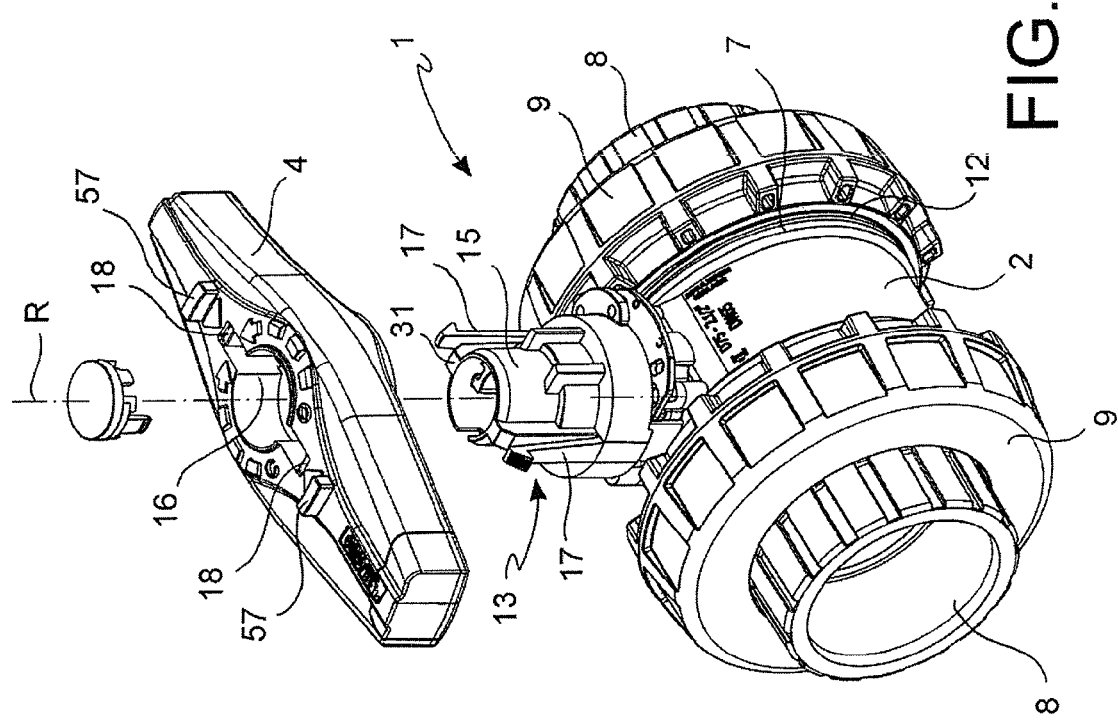
FIG. 4 is a perspective view of the valve according to one embodiment, wherein the control handle is detached from the valve body.
Figure 6:
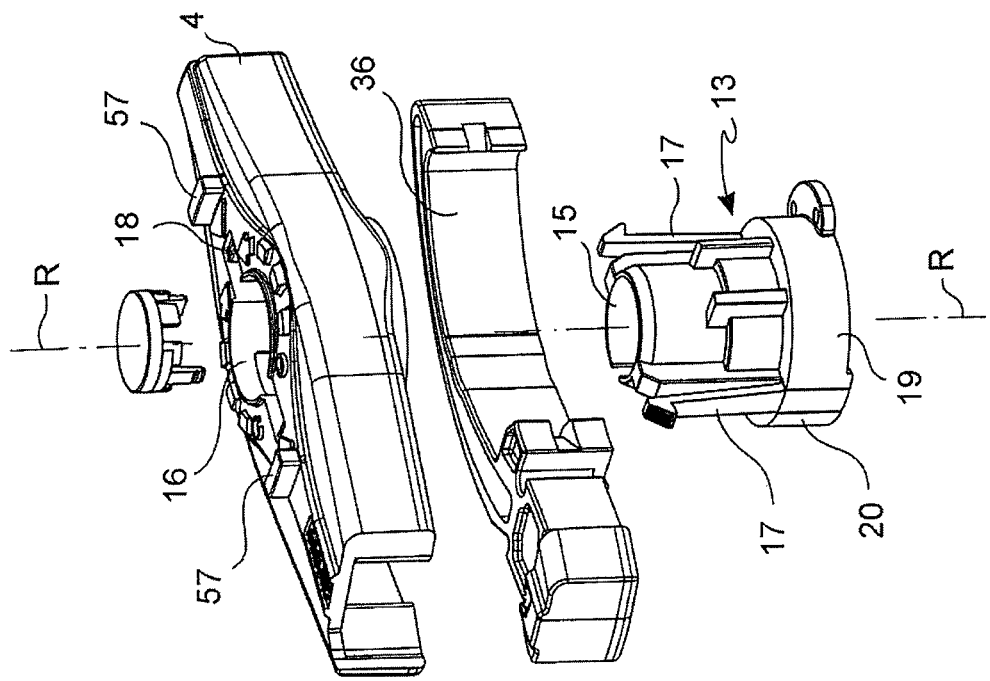
FIG. 6 is a perspective view of the valve according to a further embodiment, wherein the control handle is detached from the valve body and a ring-nut spanner tool is extracted from its seat made in the control handle.
Figure 7:
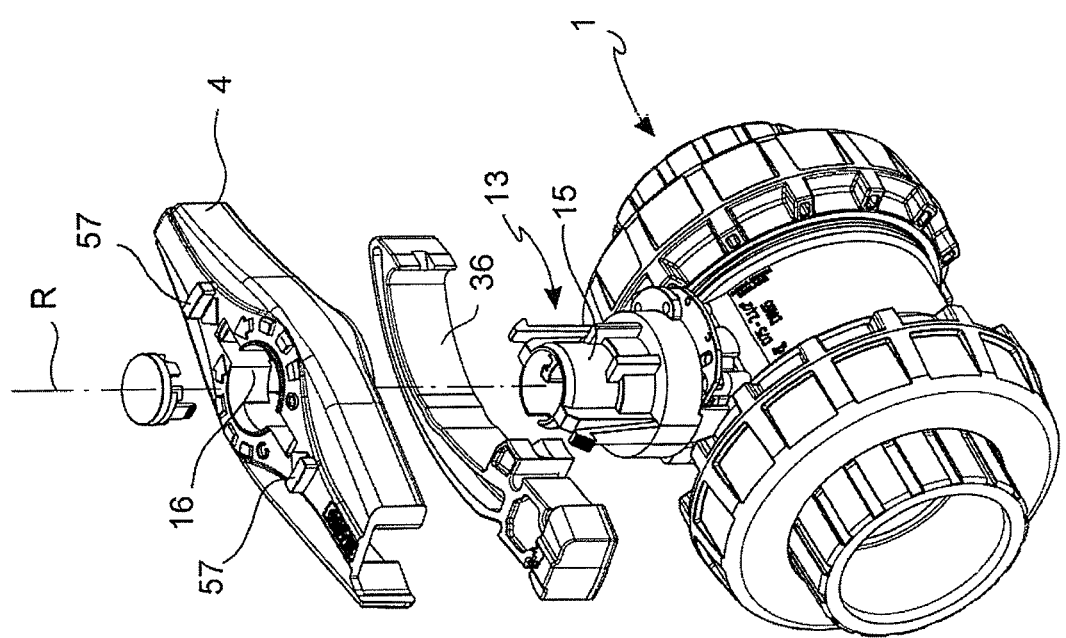
FIG. 7 is an exploded view of a detail of the valve in FIG. 6.
Figure 10:
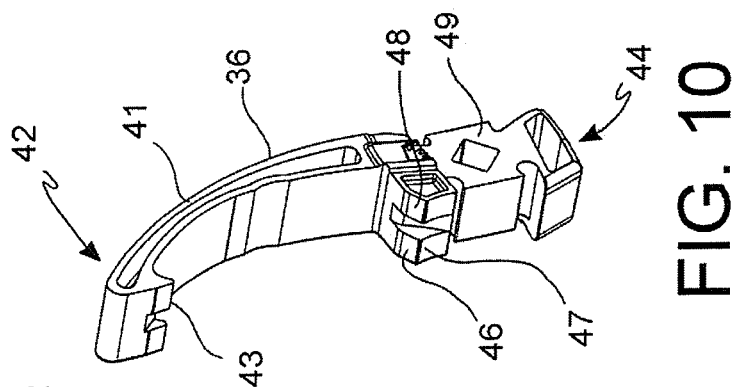
FIGS. 9 and 10 are perspective views of the ring-nut spanner tool according to one embodiment.
Figure 9:
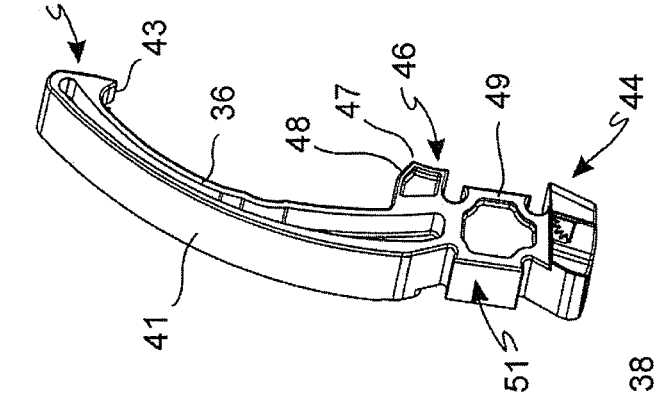
Figure 11:
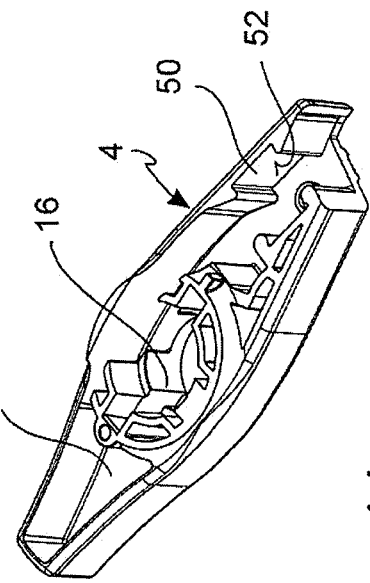
FIG. 11 is a perspective view of the control handle (with ring-nut spanner tool removed) according to one embodiment.

With reference to the figures, a fluid conveying and/or distributing device, in particular a valve, is globally denoted by reference numeral 1. By way of a non-limiting example, such a valve may comprise a valve body or housing 2, an shutter 3 positioned inside the valve body 2, a control handle 4 connected to the housing 2 so as to rotate and suitable for positioning the shutter 3 by means of a drive shaft 5 placed in a special passage 6 of the housing 2. Depending on its operating position, the shutter 3 influences (for example regulates, blocks, divides or distributes) a flow of fluid, such as a liquid which goes through the valve or more generally through the device 1.

The housing 2 forms one or more tubular connection portions 7 detachably connected to corresponding connection ends 8 of a fluid conveying and/or distributing system, such as a system of pipes. The connection portions 7 of the device 1 and the connection ends 8 of the pipe system are connected to each other by one or more ring-nuts 9 couplable to one and screwable to the other of the connection portions 7 and connection ends 8. By way of example, the ring-nut 9 may comprise a shoulder 10 which engages a flange (not visible in the figures) of a tube and an inner threading 11 screwable to a corresponding outer threading 12 of the connection portion 7 of the device 1.

According to a first aspect of the invention, the device comprises connection means for a detachable and snap connection of the control handle 4 to the housing 2.

Thanks to the detachable and snap connection of the control handle 4, it can be rapidly and easily removed and attached to the housing 2, such as a valve body of a ball valve, to temporarily increase the access space to the connection portions 7 and/or for a temporary use of the control handle 4 as a tool for manipulating the device 1. This facilitates and speeds up the assembly and dismantling of the device 1 in a fluid conveying and distribution system, especially in conditions of restricted space.

According to one aspect of the invention, the snap connection means comprise a connection hub 13 connected to an outer end 14 of the drive shaft 5 and having a coupling portion 15 suitable for engaging a corresponding coupling seat 16 made in the control handle 4, joined in rotation around a control axis R which constitutes the rotation axis of the drive shaft 5 and of the shutter 3 of the valve 1. This way when the control handle 4 is rotated in relation to the valve body 2 around the control axis R, the connection hub 13 and the drive shaft 5 also rotate with the handle 4. The drive shaft 5 is connected in a non-releasable way to the valve body 2 and connected integrally in rotation to (i.e. such as to rotate together with) the shutter 3, for example a ball shutter.

The connection hub 13 further comprises one or more, preferably two, flexible teeth 17 suitable for snap engaging corresponding stop surfaces 18 of the coupling seat 16 of the control handle 4.

Alternatively, the flexible teeth may be fitted to the coupling seat 16 of the control handle 4 and suitable for snap engaging corresponding stop surfaces made in the connection hub 13.

According to one embodiment, the connection hub 13 forms a lower flange or base 19 on its lower side facing towards the valve body 2. The base 19 forms a circumferential wall 20, for example of a tubular or cylindrical shape, which defines internally a cavity suitable for receiving the outer end 14 of the drive shaft 5 and which covers the connection area between the drive shaft 5 and the connection hub 13. The base 19, in particular the circumferential wall 20, forms two abutment surfaces 21 configured to abut, in predefined rotary end stop positions of the drive shaft 5, against corresponding counter abutment surfaces 22 of the valve body 2. This way the risk of accidental over-rotation (rotation beyond the envisaged rotary stroke) of the shutter 3 is prevented in that the rotary stroke (for example of 90°) of the shutter 3 is limited by the abutment surfaces 20 of the connection hub 13 which remain firmly connected to the drive shaft 5.

For the connection integrally in rotation (i.e. rotationally stiff) of the drive shaft 5 and the connection hub 13, the base 19 forms an anti-rotation portion 23, for example star-shaped or polygonal, suitable for being inserted in a corresponding anti-rotation seat 24 of a complementary shape, made in the outer end 14 of the drive shaft 5. Advantageously, the anti-rotation portion 23 may be received in the anti-rotation seat 24 by a rotationally stiff shape fit (i.e. geometrical connection) in a plurality of relative rotary positions and the correct relative positioning is ensured by one, preferably two, positioning protuberances 25 projecting from the circumferential wall 20 towards the inside of the base 19 and corresponding positioning cavities 26 formed in the drive shaft 5. This facilitates the assembly of the shutter-shaft-connection hub group and simplifies the correct positioning of these components.

According to one embodiment, the base 19 may form a first lock plate 27 projecting from the circumferential wall 20 radially outwards and having one or more through holes for a locking by means of a lock to a second lock plate 28 connected to the valve body 2. This permits a blocking of the valve in specific positions (open, closed, intermediate) by means of a lock. The connection area, for example screwing area, of the second lock plate 28 to the valve body 2 is advantageously covered by the base 19, in particular by the circumferential wall 20, and thereby protected from unauthorised tampering. The circumferential wall 20 forms a groove or cavity 29 at the point of the trajectory of movement of the second lock plate 28 in relation to the base 19 of the connection hub 13, and in the area not affected by the movement of the second lock plate 28 the circumferential wall 20 extends beyond such groove 29 to close the space inside the base 19 more completely.

The coupling portion 15 forms a tubular wall 30 with a plurality of radial projections 31 suitable for engaging corresponding radial cavities 32 of the coupling seat 16 of the control handle 4 (connected to rotate together), as well as an axial shoulder 33 suitable for forming an insertion-stop abutment of the coupling portion 15 in the coupling seat 16 of the handle 4, in such a way that the handle 4 is blocked against axial shifts on one side by the flexible teeth 17 (anti-extraction) and on the other side by the shoulder 33.

Advantageously, the flexible teeth 17 are positioned in diametrically opposite and radially external positions to the tubular wall 30 and comprise a tongue 34 projecting from the base 19 and elastically flexible in a radial direction to the control axis R, as well as a tooth 35 which projects from the free end of the tongue 34 radially outwards. Near each flexible tooth 17 the tubular wall 30 forms a sturdy radial projection 31 extending along a main part of the length of the flexible tooth 17 and having a greater or the same width as the width of the flexible tooth 17 (in a direction tangential to the tubular wall 30). Each flexible tooth 17 and the corresponding radial projection 31 are radially aligned and may be inserted together in the same radial cavity 32 of the coupling seat 16. This way, the radial projection 31 protects the flexible tooth 17 from excessive stress and from the risk of breaking during the snap coupling and during dismantling by means of a manual radial shift of the flexible teeth 17. Moreover, the radial projections 31 radially aligned with the flexible teeth 17 ensure that the flexible teeth 17 do not participate in the transmission of the torsion from the control handle 4 to the connection hub 13.

According to a further embodiment (as an alternative to or in combination with the previously described snap connection features), the device 1, in particular the ball valve, comprises a ring-nut spanner tool 36 suitable for engaging an attachment portion 37 of the ring-nut 9 so to enable the screwing and unscrewing of the ring-nut 9 from the connection portions 7.

The ring nut spanner tool 36 is housed in a rest position in a tool cavity 38 made in the control handle 4 and can be moved from the rest position out of the tool cavity 38 to a working position wherein the ring-nut spanner tool 36 can engage the attachment portion 37 of the ring-nut 9.

The attachment portion 37 may advantageously be made in a radially outer surface 39 of a side wall 40 of the ring-nut 9. The attachment portion 37 may comprise a plurality of projections and/or indentations, such as ribs 45 extending in an axial direction of the ring-nut 9 and, preferably, distributed all around the side wall 40.

The ring-nut spanner tool 36 may comprise a curved elongated body 41 with a curvature suitable for embracing a section of outer circumference of the side wall 40 of the ring-nut 9, for example, a section of circumference corresponding to an angle of 65° to 125°, preferably 65° to 90°, even more preferably of approximately 70°. The elongated body 41 forms at one of its first ends 42 a hook portion 43 projecting onto the concave side and facing towards a second end 44 of the elongated body 41 and suitable for engaging (preferably hooking to) the attachment portion 37, and in particular to one of the ribs 45 so as to be able to drag it in a circumferential direction of the ring-nut 9 towards the side of the second end 44 of the elongated body.

The elongated body 41 forms, in addition, (near the second end 44) a contrast portion 46 distanced from and opposite to the hook portion 43 and suitable for abutting in a radial direction against the attachment portion 37 of the ring-nut in such a way that the hook portion 43 hooked to the attachment portion 37 and the contrast portion 46 abutting against the attachment portion 37 can transmit an unscrewing or screwing momentum and a corresponding rotation to the ring-nut 9.

The contrast portion 46 also projects onto the concave side of the elongated body 41 and forms a first contrast surface 47 facing in a radial direction (in relation to the curvature of the elongated body 41 and the ring-nut 9) for a radial support against the side wall 40 of the ring-nut 9, as well as a second contrast surface 48 facing towards the hook portion 43 and suitable for resting against one of the ribs 45 in a circumferential direction of the side wall 40 of the ring-nut 9, but in the opposite direction to the direction of engagement of the hook portion 43.

Figure 8:
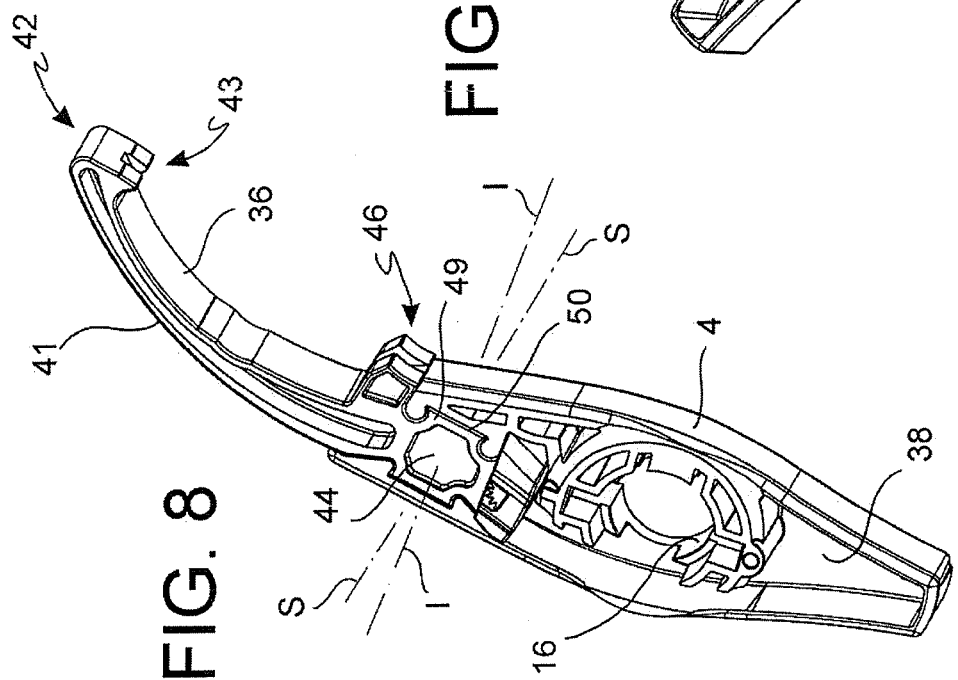
FIG. 8 shows the ring-nut spanner tool of FIG. 6 extracted from the control handle in a working position wherein the control handle forms a handle for the ring nut spanner tool.
Figure 13:
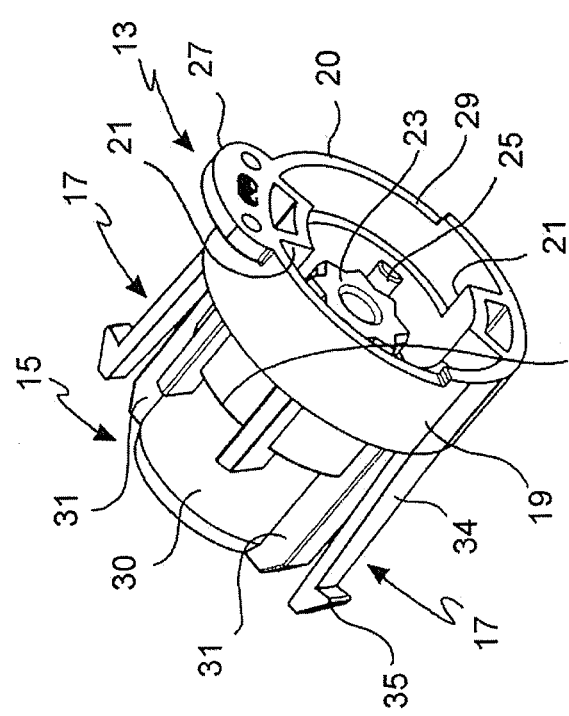
FIGS. 12 and 13 are perspective views of a connection hub for the snap connection of the control handle to the valve body.
Figure 15:
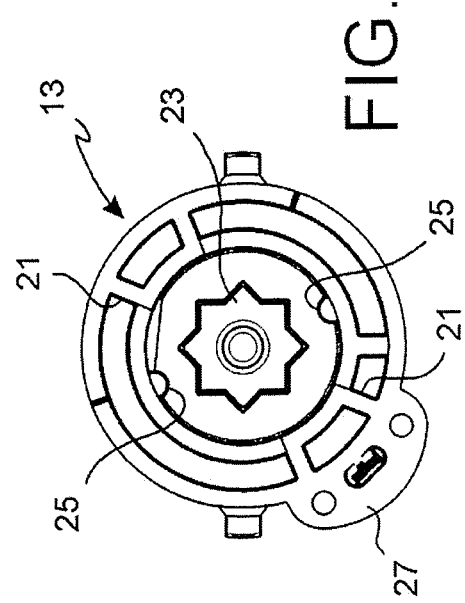
FIGS. 14 and 15 are views from above and below of the connection hub in FIG. 12.
Figure 12:
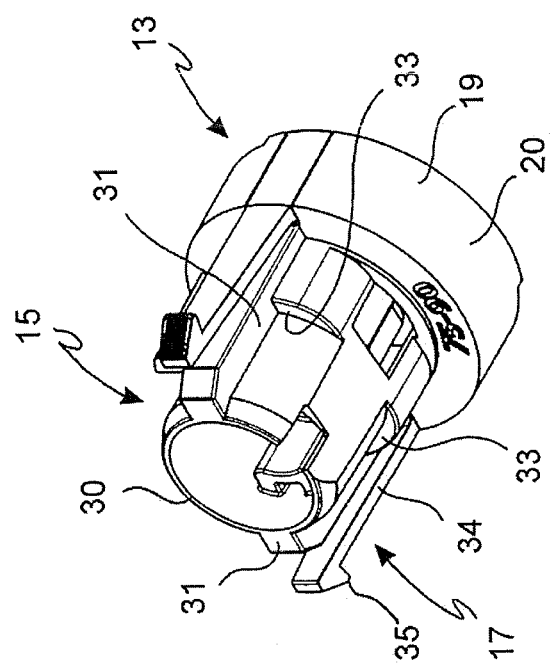
Figure 14:
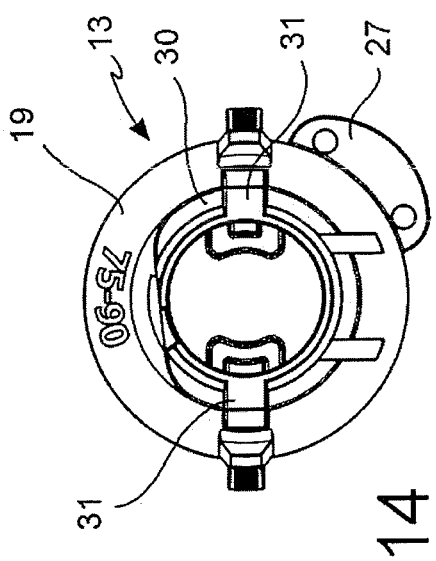
Figure 17:
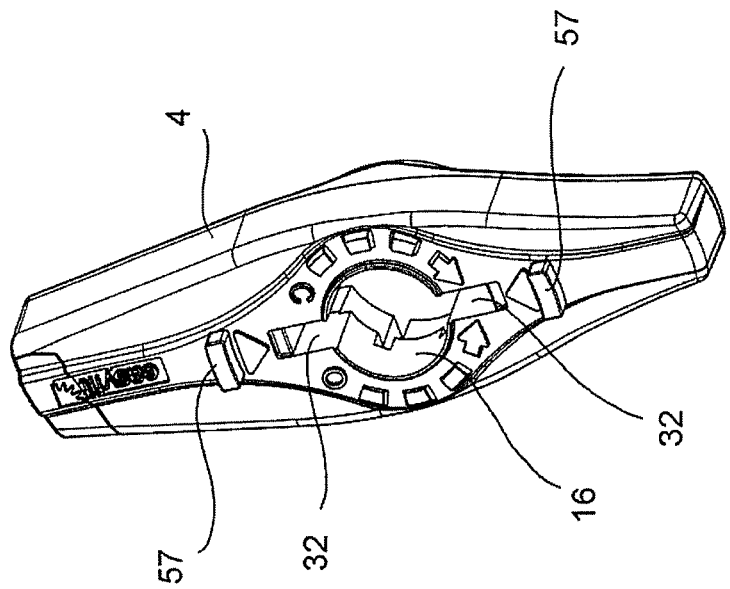
FIGS. 16 and 17 are perspective views of the control handle according to one embodiment without the ring-nut spanner.
Figure 16:
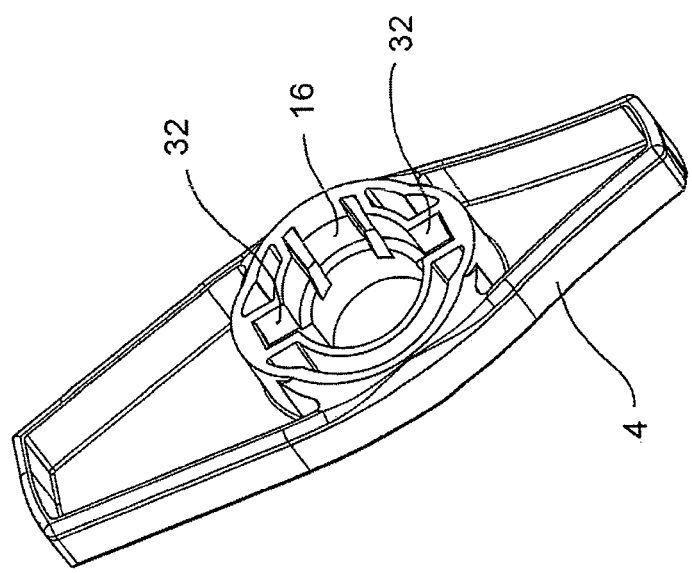
Figure 21:
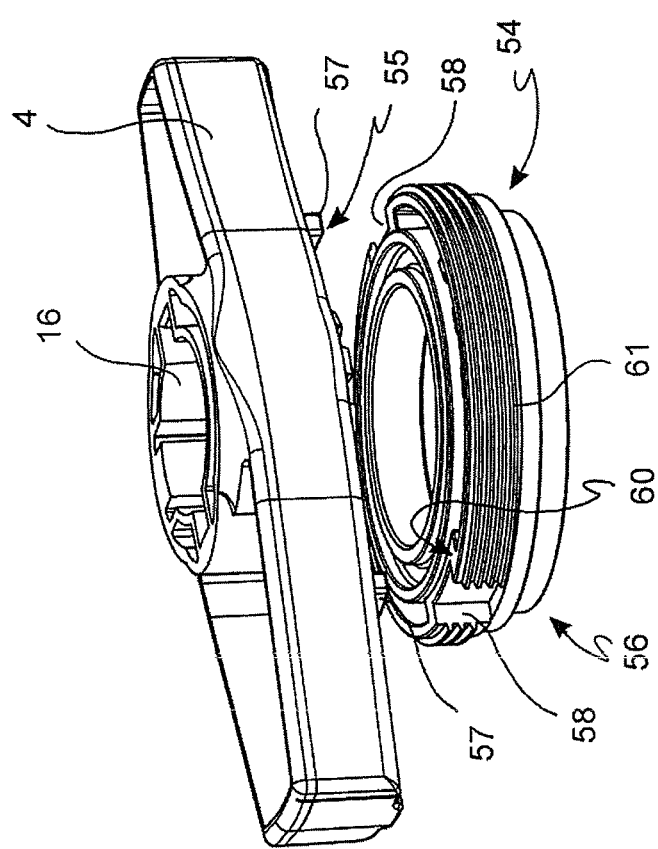
Figure 24:
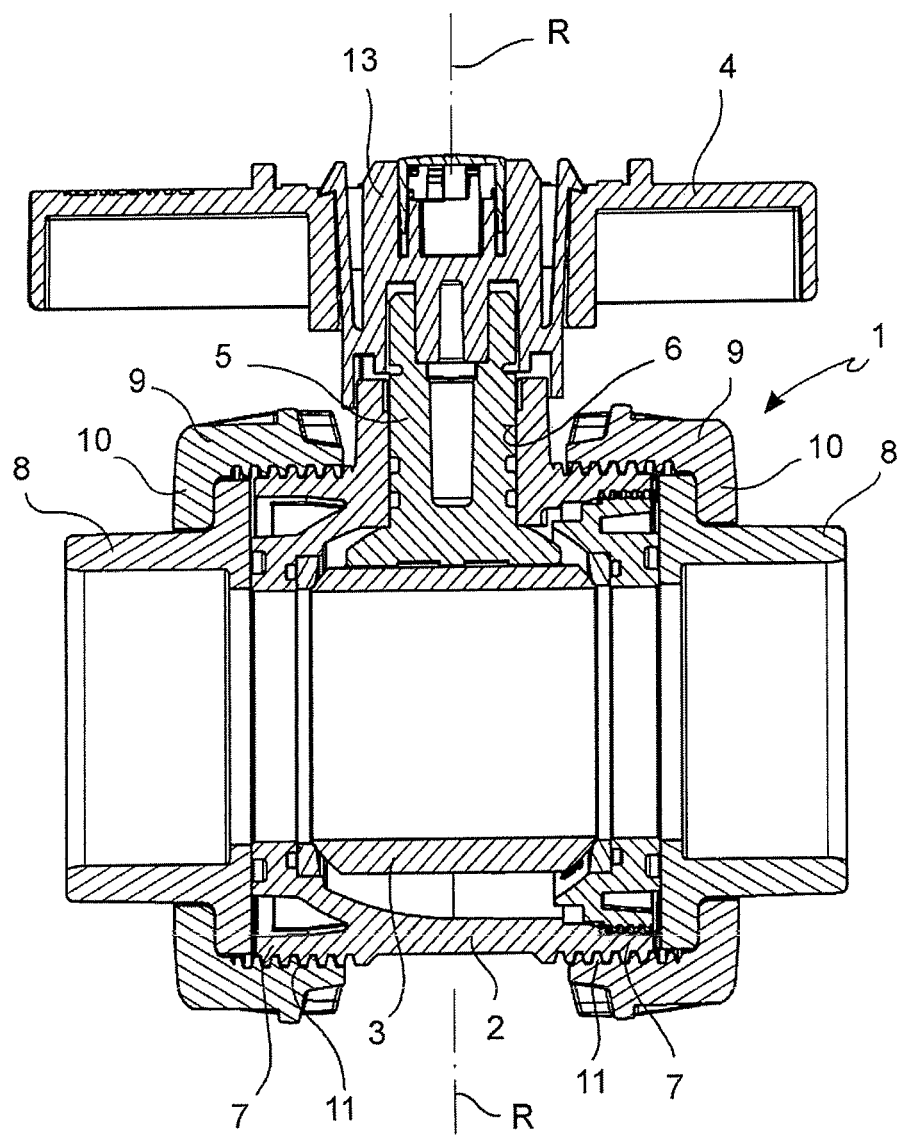
FIG. 24 is a cross-section view of a ball valve according to one embodiment.

The elongated body 41 forms, in addition, at its second end 44, a blocking head 49 suitable for being received by a geometric coupling (shaped coupling) in a corresponding blocking seat 50 of the control handle 4, in such a way as to block the ring-nut spanner tool 36 in the working position to the control handle 4. In such configuration (FIG. 8) the control handle 4 acts as a handle of the ring-nut spanner tool 36 and extends from the second end 44 of the elongated body 41 in an opposite direction to the first end 42, thus elongating the lever arm to apply the unscrewing/screwing torque to the ring nut 9.

According to one embodiment, the ring-nut spanner tool 36 may be permanently connected to the control handle 4 and movable (for example extractable telescopically or orientable like the blade of a Swiss army knife) from the rest position inside the tool cavity 38 to the working position.

Alternatively, the ring-nut spanner tool 36 is completely detachable from the control handle 4 and may be attached to it in the rest position inside the tool cavity 38 (wherein at least a predominant part of the ring-nut spanner 36 tool is contained in the space occupied by the control handle 4) and in the working position (FIG. 8) different from the rest position.

According to one embodiment, the blocking head 49 and the blocking seat 50 are both shaped so as to be of a complementary shape both in the rest position and in the working position of the ring nut spanner tool 36. In particular, the blocking head 49 and the blocking seat 50 have both a symmetrical shape to a plane of symmetry S and the blocking seat 50 receives the blocking head 49 in two positions rotated to one another by 180°.

According to one embodiment, the blocking head 49 forms two opposite, dovetailed portions preferably, the blocking head 49 is a quadrilateral shape, the four sides of which each form a dovetail portion. Similarly, the blocking seat 50 may form two opposite and dovetail shaped cavities, preferably the blocking seat 49 may have a quadrilateral shape the four sides of which each form a dovetail cavity.

In order to permit the insertion of the blocking head 49 in the blocking seat 50 in the rest and work positions rotated in relation to each other by 180°, the blocking head 49 and the blocking seat 50 have a prismatic shape with parallel lateral prismatic surfaces 51, 52 in an insertion direction I.

The tool cavity 38 is advantageously formed on the inner side 53 of the control handle 4 and faces towards the valve body. This way, during normal use of the valve, the ring nut spanner tool 36 is not exposed externally and does not obstruct the gripping of the control handle for a manipulation of the fluid flow by means of the valve.

Advantageously, the tool cavity 38 extends in a curved manner substantially along the entire length of the control handle 4, but laterally outside the coupling seat 16 for the rapid coupling of the handle 4 to the connection hub 13.

According to a further embodiment, the device 1 may comprise one or more tightening rings 54 screwable to the tubular connection portions 7 to ensure the positioning of inner components of the device 1, for example of gaskets and of the shutter 3 in the case of a ball valve.

In order to overcome the need for special tools, the control handle 4 itself may comprise an assembly portion 55 suitable for engaging a tool seat 56 made in the tightening ring 54 so as to enable the assembly and dismantling of the tightening rings 54 and of the inner components of the device 1.

According to one embodiment, the assembly portion 55 comprises two protuberances 57 suitable for being inserted in special recesses 58 made in the tightening ring 54. The assembly portion 55 may be made on an outer side 59 (facing away from the valve body 2) or on the inner side 53 of the control handle 4 (facing towards the valve body 2 with the handle 4 mounted on the valve body 2). The recesses 58 may advantageously be extended from a front surface 34 of the tightening rings 54 up to a radially external threading 61 thereof in such a way that the protuberances 57 of the assembly portion 55 inserted in the recesses 58 engage both the tightening ring 54 and the (intrados of) the connection portion 7. This stabilises the position of the control handle 4 during the unscrewing and screwing of the tightening rings 54 and obviates the risk of injury to the user.

The device 1, in particular the ball valve, and all its components may be made at least partially, preferably entirely, in synthetic material, for example polymeric.

Obviously, a person skilled in the art may make further modifications and variations to the device 1 according to the present invention so as to satisfy contingent and specific requirements, while remaining within the sphere of protection of the invention, as defined by the following claims.

What is claimed is:

1. A ball valve, comprising:
a valve body with one or more tubular connection portions detachably connectable to corresponding connection ends of a fluid conveying system,
a control handle,
a shutter housed in the valve body and connected to the control handle by means of a drive shaft,
one or more threaded ring-nuts screwable to said connection portions and connection ends to connect them, and
a ring-nut spanner tool suitable for engaging an attachment portion of the ring-nut to screw and unscrew the ring-nuts from the connection portions, wherein the ring-nut spanner tool is housed in a rest position in a tool cavity made in the control handle and can be moved from the rest position to a working position outside the tool cavity, and wherein in the working position the ring-nut spanner tool can engage the attachment portion of the ring-nut.

2. The ball valve according to claim 1, wherein the attachment portion is formed in a radially outer surface of a side wall of the ring-nut and comprises a plurality of ribs extending in an axial direction of the ring-nut and distributed all around the side wall.

3. The ball valve according to claim 1, wherein the ring-nut spanner tool comprises a curved elongated body with a curvature suitable for embracing a section of outer circumference of the ring-nut, wherein said elongated body has a first free end and a second end opposite the first end and comprises:
a hook portion formed at the first end and facing towards the second end, said hook portion being suitable for hooking to the attachment portion so as to be able to drag it in a circumferential direction of the ring-nut towards the side of the second end, and
a contrast portion made near the second end and opposite the hook portion, said contrast portion being suitable for abutting in a radial direction against the attachment portion of the ring-nut, in such a way that the hook portion hooked to the attachment portion and the contrast portion abutted against the attachment portion can transmit an unscrewing or screwing momentum and a corresponding rotation to the ring-nut.

4. The ball valve according to claim 3, wherein the ring-nut spanner tool forms at the second end a blocking head suitable for being received by a geometric coupling in a corresponding blocking seat of the control handle, in such a way as to block the ring-nut spanner tool to the control handle in said working position, wherein the control handle acts as a handle of the ring-nut spanner tool and extends from the second end of the elongated body in an opposite direction to the first end.

5. The ball valve according to claim 4, wherein the blocking head and the blocking seat are shaped so as to be of a complementary shape, both in the rest position and in the working position of the ring-nut spanner tool, in such a way that the blocking seat may receive the blocking head with a shape coupling in two positions, one upside-down in relation to the other, wherein the tool cavity is made on an inner side of the control handle facing towards the valve body during normal use of the valve.

6. The ball valve according to claim 1, wherein the ring-nut spanner tool is permanently connected to the control handle and movable, particularly extractable telescopically or orientable like the blade of a Swiss army knife, from the rest position inside the tool cavity to the working position.

7. The ball valve according to claim 1, wherein the ring-nut spanner tool is completely detachable from the control handle and may be attached to the control handle in the rest position inside the tool cavity and in the working position.

8. The ball valve according to claim 1, comprising elastic snap connection means for a removable connection of the control handle to the valve body.

9. The ball valve according to claim 8, wherein the snap connection means comprise a connection hub connected to an outer end of the drive shaft, said connection hub having:
a coupling portion suitable for rotationally integrally engaging a corresponding coupling seat made in the control handle, and
one or more flexible teeth suitable for snap engaging corresponding stop surfaces of the coupling seat of the control handle.

10. The ball valve according to claim 9, wherein the connection hub forms a base with a circumferential wall which covers a connection area between the drive shaft and the connection hub, wherein the base forms two abutment surfaces configured to abut, in rotary end stop positions of the drive shaft, against corresponding counter-abutment surfaces of the valve body.

11. The ball valve according to claim 10, wherein the base forms a first lock plate projecting radially outwards from the circumferential wall and having one or more through holes for a blocking by means of a lock to a second lock plate connected to the valve body, wherein a connection area of the second lock plate to the valve body is covered by the base.

12. The ball valve according to claim 9, wherein said coupling portion forms:
a tubular wall with a plurality of radial projections suitable for engaging corresponding radial cavities of the coupling seat of the control handle, and an axial shoulder suitable for forming an insertion-stop abutment of the coupling portion in the coupling seat of the handle, in such a way that the handle is blocked against axial shifts on one side by the flexible teeth and on the other side by the shoulder.

13. The ball valve according to claim 11, wherein the flexible teeth are positioned in diametrically opposite and radially external positions to the tubular wall and comprise a tongue elastically flexible in a radial direction to the control axis (R) of the drive shaft, as well as a tooth which projects radially outwards from a free end of the tongue.

14. The ball valve according to claim 13, wherein at each flexible tooth, the wall forms one of the radial projections extending along a prevalent part of the length of the flexible tooth and having a width in a direction tangential to the tubular wall, said width being the same or greater than the width of the flexible tooth, wherein each flexible tooth and the corresponding radial projection are radially aligned and may be inserted together in the same radial cavity of the coupling seat.

15. The ball valve according to claim 1, comprising one or more tightening rings screwable onto the tubular connection portions to ensure the positioning of inner components of the valve, wherein the control handle forms an assembly portion suitable for engaging a tool seat made in the tightening ring for the screwing and unscrewing of the tightening rings.

* * * * *